United States Patent [19]

Foy

[11] Patent Number: 4,932,620
[45] Date of Patent: Jun. 12, 1990

[54] ROTATING BRACKET

[76] Inventor: Russell B. Foy, 122 N. 82nd, Seattle, Wash. 98103

[21] Appl. No.: 350,103

[22] Filed: May 10, 1989

[51] Int. Cl.⁵ .......................................... F16M 13/00
[52] U.S. Cl. .................................. 248/124; 248/286
[58] Field of Search ............... 248/124, 125, 278, 279, 248/285, 286, 122, 413, 289.1, 291; 362/287, 419

[56] References Cited

U.S. PATENT DOCUMENTS

| | | | |
|---|---|---|---|
| 1,459,856 | 6/1923 | Otte | 362/419 |
| 1,491,893 | 4/1924 | Anderson | 362/419 |
| 2,621,882 | 12/1952 | Fletcher | 248/285 |
| 2,701,113 | 2/1955 | Koonter | 248/278 |
| 2,976,002 | 3/1961 | Green | 248/278 |
| 3,010,687 | 11/1961 | Hagberg | 248/278 |
| 3,086,715 | 4/1963 | Mineau | 248/124 |
| 3,089,028 | 5/1963 | Klampferer | 248/124 |
| 4,251,043 | 2/1981 | Horner | 248/124 |
| 4,265,029 | 5/1981 | Jenkins | 248/124 |

*Primary Examiner*—David M. Purol
*Assistant Examiner*—Robert A. Olson
*Attorney, Agent, or Firm*—Cassidy, Vance & Tarleton

[57] ABSTRACT

A rotating bracket (10) having a sleeve (20) slidably engaged with a vertical post, am arm (22) attached to the sleeve, and an extension (24) rotatably mounted to the arm (22) to position a curing lamp (14) at a desired rotational orientation. A bearing plate (36) on the arm (22) cooperates with the bearing plate (46) on the extension (24) to facilitate smooth rotation. A helical compression spring (58) urges said bearing plates (36 and 46) into contact to hold the extension (24) and the curing lamp (14) at a desired rotational orientation.

4 Claims, 1 Drawing Sheet

ROTATING BRACKET

TECHNICAL FIELD

The present invention pertains to mounting brackets, and, more particularly, to an adjustable bracket for rotatably mounting a curing lamp to an upright post.

BACKGROUND OF THE INVENTION

Curing lamps typically have an elongate quartz bulb mounted in a rectangular reflector. The advantage of a curing lamp over a heat lamp is the curing lamp cures a substance from the inside out, resulting in a more even cure and a better appearance.

In most applications, a curing lamp is mounted to an upright post and oriented so that the elongate bulb lies in a horizontal plane. While vertical adjustment of the lamp on the upright post is accomplished by a sliding bracket, there is no adjustment of the lamp about the horizontal axis. As a result, the curing of vertically oriented structures requires the use of multiple curing lamps. One difficulty in positioning curing lamps is that they must be smoothly moved because the quartz bulb is fragile and can be easily damaged when jarred. Thus, there is a need for a bracket that permits smooth rotation of a curing lamp about a horizontal axis.

SUMMARY OF THE INVENTION

The present invention is directed to a rotating bracket for mounting rectangular curing lamps to an upright post. The bracket comprises a sleeve sized and shaped to be slidably engaged with the upright post, an arm fixedly attached at one end to the sleeve and having a second end projecting away from the sleeve, and an extension member having a longitudinal axis with one end attached to the rectangular curing lamp and the other end rotatably mounted to the second end of the arm to smoothly rotate about the longitudinal axis and thereby position the rectangular curing lamp at a desired orientation.

In accordance with another aspect of the present inveniton, the second end of the arm and the first end of the extension each have planar bearing plates that cooperate with each other to enable smooth rotation of the extension.

In accordance with yet another aspect of the present invention, the rotating bracket further comprises a retaining bolt projecting axially through the bearing plates to attach the arm to the extension. A helical compression spring is mounted coaxially over the bolt and has one end bearing against an inside surface of the bearing plate on the extension and the other end bearing against a retaining member of the bolt so that the bolt urges the bearing plate on the arm against the bearing plate on the extension to hold them at a desired rotational orientation. In accordance with still another aspect of the present invention, the bracket further comprises a threaded shaft threadably engaged a with and extending through the sleeve for bearing against the post to prevent the sleeve from sliding on the post.

As will be readily appreciated from the foregoing, the bracket facilitates positioning of the curing lamp at any desired orientation about the horizontal axis as well as the vertical axis. In addition, the cooperation of the planar bearing plates on the arm and the extension ensures a smooth rotational movement. Furthermore, the spring tension applied at the union of the bearing plates automatically holds the lamp at the selected position without requiring the use of detents or other locking mechanisms that could cause jarring of the lamp.

BRIEF DESCRIPTION OF THE DRAWINGS

The foregoing and other features and advantages of the present invention will be more readily appreciated as the same becomes better understood from the detailed description of the invention when considered in conjunction with the following drawings, wherein.

DETAILED DESCRIPTION OF THE PREFERRED EMBODIMENT

Figure 1:
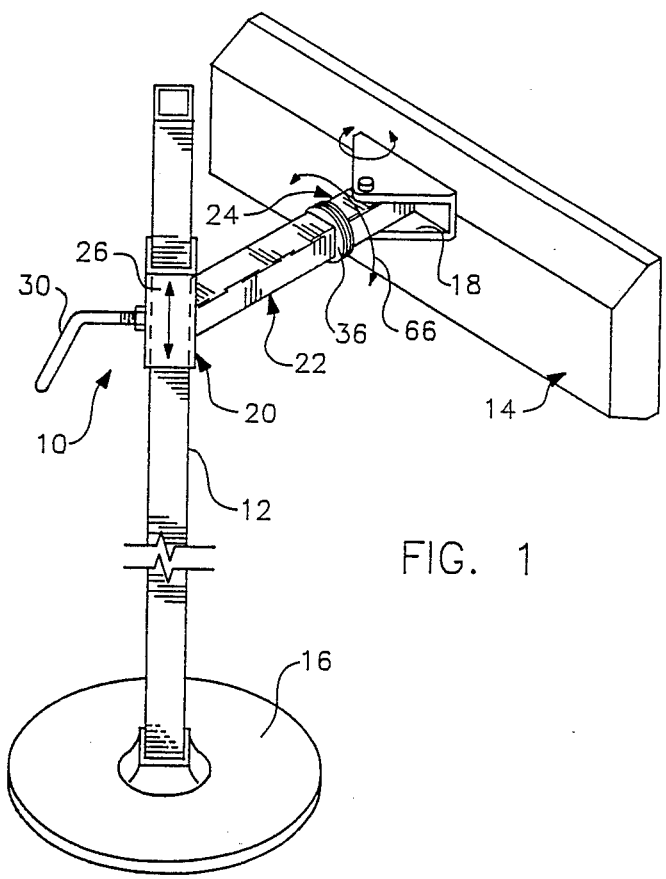
FIG. 1 is an isometric view of the rotating bracket formed in accordance with the present invention as applied to an upright post and a curing lamp.

Referring initially to FIG. 1, the rotating bracket 10 is shown in use with a vertical post 12 and a curing lamp 14. The post 12 is formed of a square-shaped tube supported at one end in a base 16. The lamp 14 is mounted to the rotating bracket 10 by a pair of flanges 18 to rotate about a vertical axis.

Figure 2:
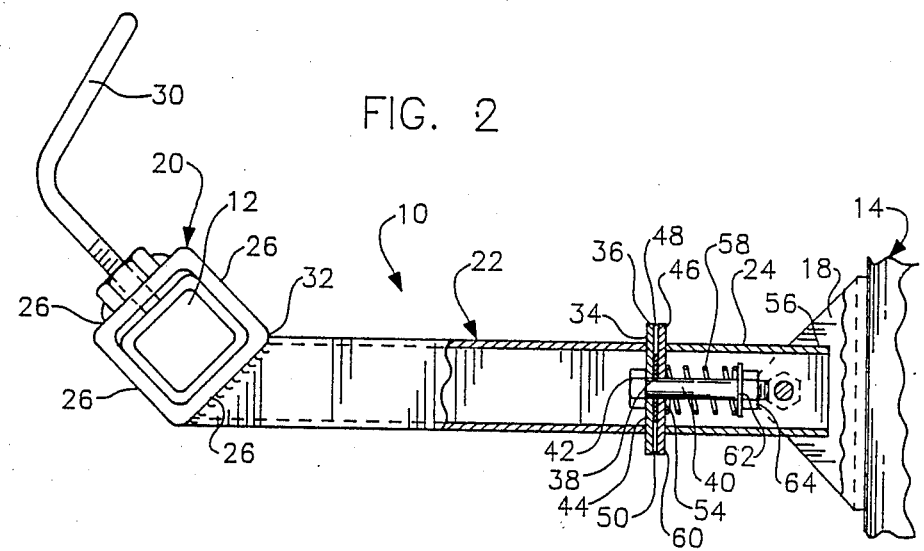
FIG. 2 is an enlarged, cross-sectional view of the bracket of FIG. 1.

As shown more clearly in FIG. 2, the rotating bracket 10 comprises a sleeve 20, an arm 22 attached to the sleeve, and an extension 24 rotatably mounted to the arm 22. The sleeve 20 comprises a hollow tube having a square cross-sectional shape with four walls 26. The sleeve 20 is sized and shaped to be slidably engaged with the vertical post 12. A nut 28 is welded to one wall 26 in axial alignment with an opening (not shown) formed in the wall 26. A threaded handle 30 is threadedly engaged with the nut 28. The threaded handle 30 projects through the opening in the wall 26 to bear against the vertical post 12 to hold the rotating bracket 10 at a desired position on the vertical post 12.

The arm 22 is formed from a square-shaped tube and has a first end 32 and a second end 34. The first end 32 is attached, preferably by welding, to the wall 26 opposite the wall in which the threaded handle 30 is mounted. As shown in FIG. 2, the arm 22 projects away from the wall 26 at approximately a 45-degree angle. On the second end 34 of the arm 22 is a bearing plate 36 positioned transversely with respect to the longitudinal axis of the arm 22. The bearing plate 36 has an opening 38 through which a retaining bolt 40 projects. The head 42 of the retaining bolt 40 is welded to the inside surface 44 of the bearing plate 36.

The extension 24 is also constructed of a square-shaped tube having a bearing plate 46 over its first end 52. The retaining bolt 40 projects through an opening 54 in the bearing plate 46 to hold the outside surface 48 of the bearing plate 46 in engagement with the bearing plate 36 on the arm 22. To reduce friction and wear, a thrust washer 50 is placed between the bearing plates 36 and 46. The second end 56 of the extension 24 is attached to the flanges 18 on the curing lamp 14. A helical compression spring 58 is mounted coaxially over the bolt 40 having one end bearing against the inside surface 60 of the bearing plate 46 on the extension 24 and the other end bearing against a retaining washer 62 held in place on the bolt 40 by a lock nut 64. Tension of the spring 58 can be adjusted by tightening or loosening the lock nut 64. The spring 58 urges the bolt 40 to hold the bearing plate 36 on the arm 22 in contact with the bearing plate 46 on the extension 24 and the thrust washer 50.

In use, the rotating bracket 10 is mounted to the vertical post 12 by sliding the sleeve 20 over the vertical post 12. The threaded handle 30 is tightened down to hold the sleeve 20 in position on the vertical post 12. With the curing lamp 14 attached to the second end 56 of the extension 24, the extension 24 can then be rotated about its longitudinal axis, which in this case is also the horizontal axis, in the direction shown by the arrow 66. The tension on the spring 58 is adjusted so that the extension 24 and the curing lamp 14 will be held at any rotational orientation at which it is positioned without being so tight as to interfere with smooth rotational movement.

While a preferred embodiment of the invention has been illustrated and described, it is to be understood that various changes may be made therein without departing from the spirit and scope of the inveniton. For instance, the vertical post 12, the sleeve 20, the arm 22, and the extension 24 may all be construction of structural members having cross-sectional shapes other than the square cross-section shapes shown and illustrated. Consequently, the scope of the invention is to be limited only by the claims which follow.

The embodiments of the invention in which an exclusive property or priviledge is claimed are defined as follows:

1. A rotating bracket for mounting a rectangular curing lamp to an upright post, the bracket comprising:
   a sleeve sized and shaped to slidably engage the upright post;
   an arm having a first and a second end, said first end attached to said sleeve, said second end projecting away from said sleeve; and
   an extension having a longitudinal axis, a first end, and a second end, said second end adapted to be attached to a rectangular curing lamp, and said first end rotatably mounted to said second end of said arm to smoothly rotate about said longitudinal axis and thereby position the rectangular curing lamp at a desired orientation, said second end of said arm and said first end of said extension having planar bearing plates that cooperate with each other to enable smooth rotation of said extension.

2. The bracket of claim 1, further comprising a retaining bolt projecting axially through said bearing plates to attach said arm to said extension and means for resiliently urging said bearing plates together.

3. The bracket of claim 2, wherein said resilient means comprises a helical compression spring mounted coaxially over said bolt and having one end bearing against an inside surface of said bearing plate on said extension and the other end bearing against a retaining means on said bolt so that said bolt urges said bearing plate on said arm against said bearing plate on said extension to hold said extension at a desired rotational orientation.

4. The bracket of claim 3, further comprising a threaded handle threadably engaged with and extending through said sleeve for bearing against said post to prevent said sleeve from sliding on said post.

* * * * *